United States Patent Office 3,799,894
Patented Mar. 26, 1974

3,799,894
ADDUCTS, CONTAINING EPOXIDE GROUPS, FROM POLYEPOXIDE COMPOUNDS AND BINUCLEAR N-HETEROCYCLIC COMPOUNDS
Daniel Porret, Binningen, Juergen Habermeier, Allschwil, and Hans Batzer, Arlesheim, Switzerland, assignors to Ciba-Geigy AG, Basel, Switzerland
No Drawing. Original application Apr. 14, 1969, Ser. No. 816,029, now abandoned. Divided and this application Nov. 2, 1971, Ser. No. 195,038
Claims priority, application Switzerland, Apr. 17, 1968, 5,635/68
Int. Cl. C08g 30/04
U.S. Cl. 260—2 EP
6 Claims

ABSTRACT OF THE DISCLOSURE

New "advanced" adducts, containing epoxide groups, from (1) polyepoxide compounds which on an average contain more than one epoxide group in the molecule, and (2) less than one equivalent of NH groups for every epoxide equivalent of the polyepoxide compound (1) of a binuclear, five or six-membered, unsubstituted or substituted N-heterocyclic compound with an endocyclic NH group in each nucleus, the heterocyclic rings being linked by a divalent aliphatic, cycloaliphatic or araliphatic radical, preferably an alkylene radical, which may be interrupted by oxygen atoms, e.g. the reaction product of 2 mols of diomethane-diglycidyl ether and 1 mole of 1,1'-methylene-bis-(5,5-dimethyl-hydantoin). The epoxide resins "advanced" by means of such nitrogen compounds have a good storage stability and excellent electrical properties.

---

This is a division of application Ser. No. 816,029 filed Apr. 14, 1969 and now abandoned.

The so-called "advancement" of relatively low molecular and low-melting or liquid epoxide resins by reaction with polyfunctional compounds of which the functional groups react with epoxide groups, to give relatively higher molecular, higher melting epoxide resins is known. Such a so-called "advancement" is above all intended to improve or modify, in the desired direction, the technical processing properties for certain end uses. For some end uses, for example in sintering powders, compression molding powders and the like, an increase in the softening point or melting point can be desirable. The so-called "advancement" produces, in parallel to the increase in size of the molecule, a lowering of the epoxide group content per kilogram of resin and hence a reduction in the reactivity. This has an advantageous effect, for example when using the product as a casting and impregnating resin, in that the shrinkage on reaction becomes less and reduces the danger of cavity formation, above all in the case of larger castings.

The manufacture of epoxide resins of relatively higher average molecular weight and correspondingly lower epoxide content can, in the known condensation of epichlorhydrin with polyhydric phenols such as diomethane [2,2-bis(p-hydroxyphenyl)propane] in the presence of alkali admittedly also take place in a single stage in that a lower stoichiometric excess of epichlorhydrin is used than for the manufacture of liquid polyglycidyl ethers. This process however suffers from the disadvantage that the sodium chloride produced during the condensation can only with difficulty be washed out of the solid epoxide resins thus obtained. Furthermore the products are as a rule very inhomogeneous in their composition and contain major proportions of branched or partially crosslinked products. The disadvantages described above can to a large extent be avoided by manufacturing, in a first stage, low molecular liquid polyglycidyl ethers which are of relatively homogeneous composition and from which sodium chloride and excess alkali can easily be washed out, and subjecting the products thus obtained to a controlled so-called "advancement" reaction in a second stage. Such processes are for example described in U.S.A. patent specifications 2,615,008 and 3,006,892. In these, dihydric phenols such as diomethane, or also dicarboxylic acids or their anhydride, are primarily used for the so-called "advancement."

When using dicarboxylic acids or dicarboxylic acid anhydrides the storage stability of the so-called "advanced" epoxide resins is frequently inadequate because these compounds represent active crosslinking agents or curing agents for the epoxide resins, and because crosslinking reactions with free hydroxyl groups of the epoxide resin are possible even when using less than stoichiometric amounts. In the use of diphenols for the so-called "advancement," which has hitherto been preferred in industry, no worsening of the storage stability like that arising from the use of dicarboxylic acids occurs. However, it is a serious disadvantage that as a result of the incorporation of the aromatic ring structure of the diphenol into the molecule of the so-called "advanced" epoxide resin its electrical properties and in particular its tracking resistance and arcing resistance are adversely influenced. Such resins tend to form carbon-containing tracks during electrical discharges and are therefore above all not as well suited to high voltage technology.

This disadvantage is particularly serious in the case of the so-called "advancement" of relatively low molecular epoxide resins which themselves do not contain any aromatic rings, for example glycidyl esters of hydroaromatic dicarboxylic acids such as tetrahydrophthalic and hexahydrophthalic acid, cycloaliphatic polyepoxides of which the epoxide groups are present in the cyclopentane or cyclohexane rings, or heterocyclic nitrogen-containing glycidyl compounds such as N,N'-diglycidyl-5,5-dimethyl-hydantoin.

These non-aromatic epoxide resins are as a rule distinguished by particularly good electrical properties. In contrast to the polyglycidyl ethers of polyphenols the chain length and the epoxide content of these non-aromatic epoxide resins cannot be varied within wide limits within the framework of a single-stage process. This aim can thus here only be achieved by a two-stage process or a so-called "advancement" reaction.

If a diphenol is used for the so-called "advancement," then the original outstanding electrical properties of the non-aromatic epoxide resins mentioned, such as above all the arcing resistance and tracking resistance, are decisively worsened as a result of the incorporation of aromatic rings into the resin molecule.

It has now surprisingly been found that instead of diphenols or dicarboxylic acids, certain binuclear N-heterocyclic compounds within each case one endocyclic NH group in each nucleus, and in particular above all bis-(hydantoin) compounds or bis(dihydrouracil) compounds can be employed for the so-called "advancement." The epoxide resins which have been so-called "advanced" with the aid of such nitrogen bases show both good storage stability and also excellent electrical properties. In the case of the so-called "advancement" of non-aromatic epoxide resins the good electrical properties are thus fully preserved. It furthermore also proves possible to improve the electrical properties of relatively low molecular polyglycidyl ethers of polyphenols by the so-called "advancement" with the abovementioned heterocyclic nitrogen compounds.

In the reaction of lower molecular diepoxide compounds with the N-heterocyclic compounds mentioned, higher molecular diepoxides having an essentially linear molecular structure are produced. Thus the reaction of 2 mols of diomethane-diglycidyl ether and 1 mol of 1,1'-methylene-bis(5,5-dimethyl-hydantoin) for example yields a so-called "advanced" linear diepoxide according to the reaction equation:

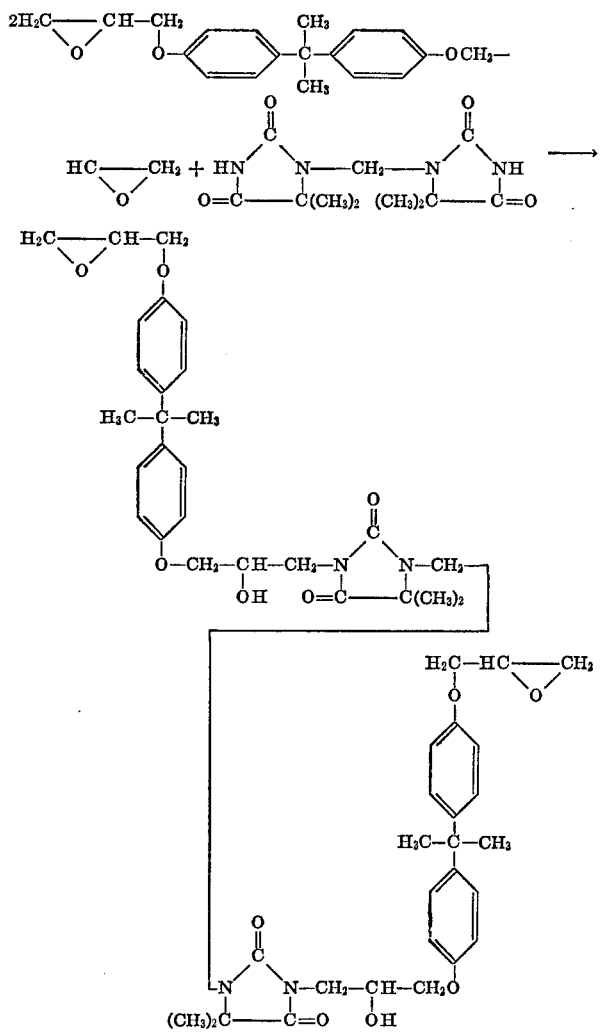

In practice more or less in homogeneous mixtures of higher polymeric and lower polymeric so-called "advanced" epoxide resins are as a rule produced, with the composition of the mixture being displaced in favor of higher polymeric compounds when using relatively larger equivalent quantities of the N-heterocyclic compound. In general the manufacture of so-called "advanced" products in which the lower polymeric constituents predominate is desirable since such products are more compatible and more easily processable. For this reason not more than 0.5 equivalent of NH group per 1 equivalent of epoxide group is in most cases used. Best results are already achieved with significantly lower stoichiometric amounts of the N-heterocyclic compounds; mixtures of so-called "advanced" diepoxides with unmodified monomeric diepoxides are thereby produced.

It is admittedly already known from U.S. patent specifications 2,947,725 and 2,940,953 to react diepoxides, such as diglycidyl ethers of dialcohols or diphenols or their mixtures with a monoepoxide, with cyanuric acid under such conditions that polyepoxide compounds of higher molecular weight are produced. Because of the trifunctionality of the cyanuric acid no polyepoxides of linear structure but only branched molecules can thereby be produced. Since cyanuric acid also acts as the cross-linking agent or curing agent for epoxide resins, the manufacture of higher molecular epoxide resins which are still soluble and fusible is furthermore very delicate; partially crosslinked or gelled products are easily produced, which are industrially unusuable.

The subject of the present invention are thus new so-called "advanced" adducts, containing epoxide groups, from (1) polyepoxide compounds having an average of more than one epoxide group, preferably 2 to 3 epoxide groups, in the molecule and (2) less than 1 equivalent of NH group per 1 epoxide equivalent of the polyepoxide Compound 1 of a binuclear N-heterocyclic compound of general formula

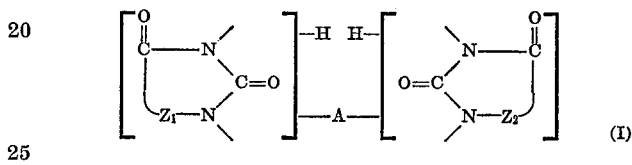

wherein $Z_1$ and $Z_2$ independently of one another each denote a nitrogen-free bivalent residue which is necessary to complete a 5-membered or 6-membered unsubstituted or substituted heterocyclic ring, and A represents a bivalent aliphatic, cycloaliphatic or araliphatic residue, and in particular preferably an alkylene residue or an alkylene residue which is interrupted by oxygen atoms.

The residues $Z_1$ and $Z_2$ preferably consist only of carbon and hydrogen or of carbon, hydrogen and oxygen. $Z_1$ and $Z_2$ can for example each be a residue of the formulae

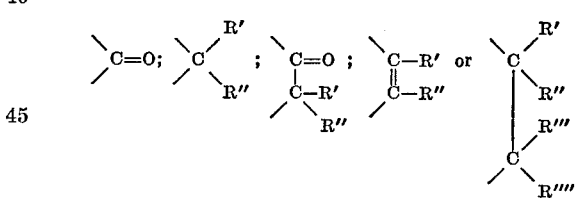

wherein R', R'', R''' and R'''' independently of one another can each denote a hydrogen atom or for example an alkyl residue, an alkenyl residue, a cycloalkyl residue or an optionally substituted phenyl residue.

Preferably, 0.02 to at most 0.5 equivalents of NH groups of the N-heterocyclic Compound 2 of Formula I are employed for the so-called "advancement" per 1 equivalent of epoxide groups of the polyepoxide Compounds 1. Best results are achieved when using 0.06 to at most 0.3 equivalents of NH group per 1 epoxide equivalent. The polyepoxide compounds which are particularly well suited to the manufacture of the new so-called "advanced" adducts containing epoxide groups are primarily those of the cycloaliphatic and of the N-heterocyclic series. Furthermore diepoxides are preferably used, and in particular those having an epoxide equivalent weight of not more than 500, preferably about 100 to 250. Such low molecular diepoxides are as a rule either liquid to highly viscous at room temperature or have a relatively low melting point. As a result of the adduct formation according to the invention such relatively low molecular diepoxides are converted into relatively higher molecular, higher melting diepoxides having an essentially linear chain structure.

As cycloaliphatic epoxide resins having at least one epoxide group present in an alicyclic 5-membered or 6-membered ring there may especially be mentioned:

vinylcyclohexene diepoxide,
limonene diepoxide,
dicyclopentadiene diepoxide,
bis(2,3-epoxycyclopentyl) ether,
bis(3,4-epoxycyclohexylmethyl)adipate,
bis(3,4-epoxy-6-methylepoxycyclohexylmethyl)adipate,
(3',4'-epoxycyclohexylmethyl)-3,4-epoxycyclohexanecarboxylate and
(3',4'-epoxy-6'-methylcyclohexylmethyl)-3,4-epoxy-6-methylcyclohexanecarboxylate;
3-(3',4'-epoxycyclohexyl)-2,4-dioxaspiro(5,5)-8,9-epoxy-undecane,
3-(glycidyloxyethoxyethyl)-2,4,-dioxaspiro(5,5)-8,9-epoxy-undecane and
3,9-bis(3',4'-epoxycyclohexyl)spirobi(meta-dioxane).

As cycloaliphatic polyepoxide compounds which, whilst containing alicyclic ring systems, have their epoxide groups in alkyl side chains (above all as glycidyl groups) there may be mentioned:

Polyglycidyl esters of hydroaromatic polycarboxylic acids, fore example $\Delta^4$-tetrahydrophthalic acid diglycidyl ester, 4-methyl-$\Delta^4$-tetrahydrophthalic acid diglycidyl ester, hexahydrophthalic acid diglycidyl ester, 4-methyl-hexahydrophthalic acid diglycidyl ester and also di- or poly-($\beta$-methylglycidyl)-ethers and di-or poly-glycidyl ethers of alicyclic alcohols such as for example the diglycidyl ethers or di-($\beta$-methylglycidyl) ethers of 2,2-bis(4'-hydroxycyclohexyl)propane, 1,4-dihydroxycyclohexane (quinitol) or $\Delta^3$-cyclohexene-1,1-dimethanol.

Possible polyepoxide compounds of the N-heterocyclic series are above all polyglycidyl compounds which contain a nitrogen-containing heterocyclic ring. One such compound is for example 1,3,5-tris-($\beta$-glycidyloxypropionyl)-hexahydro-s-triazine of formula

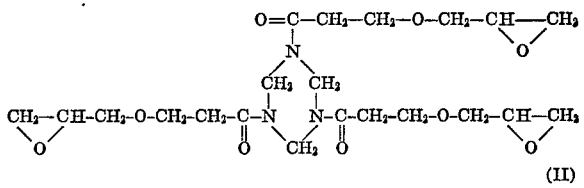

(II)

Preferably, polyglycidyl compounds of the N-heterocyclic series are employed in which the heterocyclic ring contains the grouping

at least once, and wherein the glycidyl groups are directly bonded to endocyclic nitrogen atoms. Such polyepoxides are conveniently accessible according to known methods by reaction of epichlorhydrin with heterocyclic urea derivatives such as particularly cyanuric acid, ethyleneurea, hydantoin, substituted hydantoins, bis(hydantoin) compounds, uracil, substituted uracils, or bis-(dihydrouracil) compounds in the presence of suitable catalysts, for example tertiary amines.

There may be mentioned: the triglycidylisocyanurate of formula

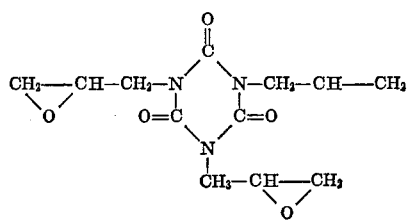

(III)

N,N' - diglycidyl-parabanic acid; N,N' - diglycidyl compounds of formula

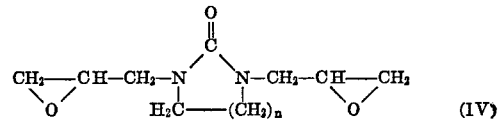

(IV)

wherein $n=1$ or 2, that is to say N,N'-diglycidylpropyleneurea and above all N,N'-diglycidylethyleneurea (=1,3-diglycidyl-imidazoline-2); N,N'-diglycidyl compounds of formula

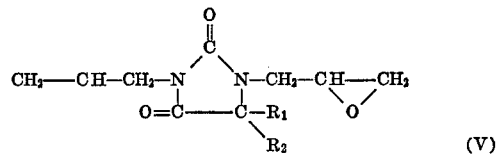

(V)

wherein $R_1$ and $R_2$ each denote a hydrogen atom or a lower alkyl residue having 1 to 4 carbon atoms or wherein $R_1$ and $R_2$ together form a tetramethylene or pentamethylene residue; representatives of this class of compound are for example:

1,3-diglycidyl-hydanton,
1,3-diglycidyl-5-methyl-hydantoin,
1,3-diglycidyl-5-n-propyl-hydantoin,
1,3-diglycidyl-5-methyl-5-ethyl-hydantoin,
1,3-diglycidyl-1,3-diazaspiro(4,5)decane-2,4-dione,
1,3-diglycidyl-2,3-diazaspiro(4,4)-nonane-2,4-dione and especially 1,3-diglycidyl-5,5-dimethyl-hydantoin as well as 1,3-diglycidyl-5-isopropyl-hydantoin.

N,N'-diglycidyl compounds of formula

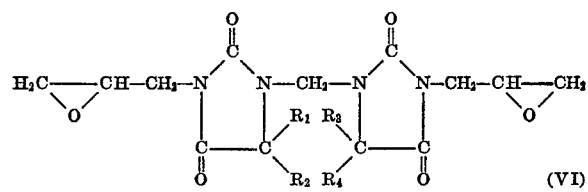

(VI)

wherein $R_1$, $R_2$, $R_3$ and $R_4$ each denote a hydrogen atom or a lower alkyl residue having 1 to 4 carbon atoms, or wherein $R_1$ and $R_2$ and/or $R_3$ and $R_4$ together form a tetramethylene or pentamethylene residue; representatives of this class of compound are for example bis-(3-glycidyl-5,5-dimthylhydantoinyl-1)-methane,
bis-(3-glycidyl-5-methyl-5-ethyl-hydantoinyl-1)-methane, and
bis-(3-glycidyl-5-propylhydantoinyl-1)-methane.

N,N'-diglycidyl compounds of formula

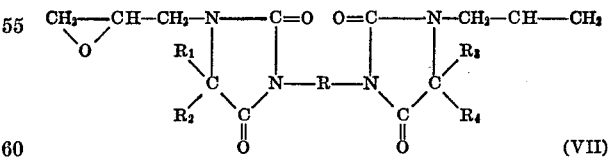

(VII)

wherein R is an aliphatic, cycloaliphatic or araliphatic residue and $R_1$, $R_2$, $R_3$ and $R_4$ each denote a hydrogen atom or a lower alkyl residue having 1 to 4 carbon atoms, or wherein $R_1$ and $R_2$ and/or $R_3$ and $R_4$ together form a tetramethylene or pentamethylene residue; representatives of this class of compound are for example bis(1-glycidyl-5,5-dimethylhydantoinyl-3methane,
1,2-bis(1'-glycidyl-5',5'-dimethylhydantoinyl-3')-ethane,
1,4-bis(1'-glycidyl-5',5'-dimethylhydantoinyl-3')butane,
1,6-bis(1'-glycidyl-5',5'-dimethylhydantoinyl-3')hexane,
1,12-bis(1'-glycidyl-5',5'-dimethylhydantoinyl-3') dodecane, and
$\beta,\beta'$-bis(1'-glycidyl-5',5'-dimethylhydantoinyl-3')diethyl ether.

N,N'-diglycidyl compounds of formula

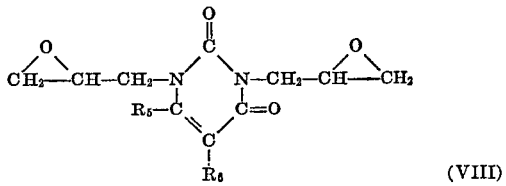

(VIII)

wherein $R_5$ and $R_6$ independently of one another each denote a hyrdrogen atom or a lower alkyl residue having 1 to 4 carbon atoms; representatives of this class of compound are for example 1,3-diglycidyl-uracil, 1,3-diglycidyl-6-methyl-uracil and 1,3-diglycidyl-5-methyl-uracil.

N,N'-diglycidyl compounds of formula

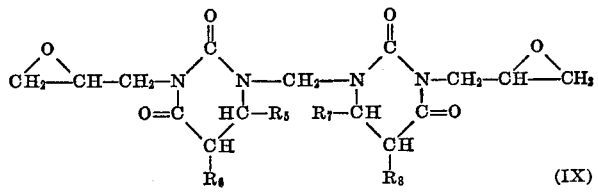

(IX)

wherein $R_5$, $R_6$, $R_7$ and $R_8$ independently of one another each denote a hydrogen atom or a lower alkyl residue having 1 to 4 carbon atoms; representatives of this class of compound are for example 3,3'-diglycidyl-1,1'-methylene-bis(5,6-dihydrouracil), and 3,3'-diglycidyl-1,1'-methylene-bis(6-methyl-5,6-dihydrouracil).

It is of course also possible to use mixtures of the above-mentioned cycloaliphatic and/or heterocyclic epoxide resins, whereupon mixed adducts are formed.

It is however also possible to use other known classes of polyepoxide compounds or epoxide resins for the manufacture of the adducts according to the invention, for example diglycidyl or polyglycidyl ethers of polyhydric aliphatic alcohols, such as 1,4-butanediol or polyglycols such as polypropylene glycol; diglycidyl or polyglycidyl ethers of polyhydric phenols such as resorcinol, bis(p-hydroxyphenyl)methane, 2,2 - bis(p-hydroxyphenyl)propane (=diomethane or bisphenol A), 2,2-bis(4'-hydroxy-3',5'-dibromophenyl)propane, 1,1,2,2-tetrakis(p-hydroxyphenyl)ethane or condensation products of phenols with formaldehyde obtained under acid conditions such as phenol novolacs and cresol novolacs.

Polyglycidyl esters of polybasic aliphatic or aromatic carboxylic acids such as adipic acid, phthalic acid, isophthalic acid, terephthalic acid or trimellitic acid; also triglycidyl cyanurate (manufactured by condensation of 1 mol of cyanuric chloride with 3 mols of glycidol).

N-glycidyl derivatives of amines such as N,N-diglycidyl-aniline, N,N - diglycidyl-toluidine, and N,N,N'-,N'-tetra-glycidyl-bis(p-aminophenyl)methane.

However it is above all the advantageous electrical properties of the moulding materials manufactured with such adducts based on aromatic polyepoxides which as a rule are less pronounced than when using adducts based on the cycloaliphatic or N-heterocyclic polyepoxide compounds which were mentioned earlier.

The binuclear N-heterocyclic compounds of Formula I used for the manufacture of the new adducts according to the invention are above all bis(hydantoin) compounds or bis(dihyrouracil) compounds in which the two N-heterocyclic rings are linked to one another via an alkylene bridge, for example a methylene group, which is bonded in each case to one endocyclic nitrogen atom of the heterocyclic rings in question.

A first class of such bis(hydantoin) compounds corresponds to the general formula

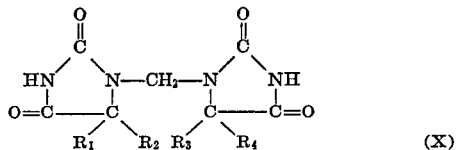

(X)

wherein $R_1$, $R_2$, $R_3$, and $R_4$ each denote a hydrogen or a lower alkyl residue having 1 to 4 carbon atoms, or wherein $R_1$ and $R_2$ or $R_3$ and $R_4$ together form a tetramethylene or pentamethylene residue.

There may for example be mentioned
1,1'-methylene-bis(5,5-dimethyl-hydantoin),
1,1'-methylene-bis(5-methyl-5-ethylhydantoin),
1,1'-methylene-bis(5-propyl hydantoin), and
1,1'-methylene-bis(5-isopropyl-hydantoin).

A further class of such bis(hydantion) compounds corresponds to the general formula

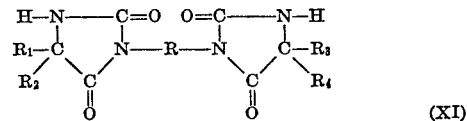

(XI)

wherein R is an aliphatic, cycloaliphatic or araliphatic residue, especially an alkylene residue or an alkylene residue interrupted by oxygen atoms and $R_1$, $R_2$, $R_3$ and $R_4$ each denote a hydrogen or a lower alkyl residue having 1 to 4 carbon atoms, or wherein $R_1$ and $R_2$ or $R_3$ and $R_4$ together form a tetramethylene or pentamethylene residue.

There may be mentioned bis(5,5-dimethyl-hydantoinyl-3)methane,
1,2-bis(5',5'-dimethyl-hydantoinyl-3')-ethane,
1,4-bis(5',5'-dimethyl-hydantoinyl-3')-butane,
1,6-bis(5',5'-dimethyl-hydantoinyl-3')-hexane,
1,12-bis(5',5'-dimethyl-hydantoinyl-3')-dodecane, and
β,β'-bis(5',5'-dimethyl-hydantoinyl-3')-diethyl ether.

A preferentially used class of bis(dihydrouracil) compounds corresponds to the general formula

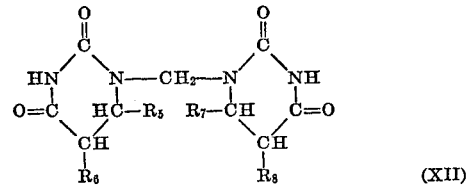

(XII)

wherein $R_5$, $R_6$, $R_7$ and $R_8$ independently of one another each denote a hydrogen atom or a lower alkyl residue having 1 to 4 carbon atoms.

There may be mentioned: 1,1'-methylene-bis(5,6-dihydro-uracil), 1,1' - methylene-bis(6 - methyl-5,6-dihydro-uracil) and 1,1' - methylene-bis(5,5-dimethyl-5,6-dihydro-uracil).

The new adducts according to the invention are as a rule manufactured by heating the polyepoxide Compound 1 together with the binuclear N-heterocyclic compound of Formula I and in particular as a rule in the temperature range of 100–200° C. and preferably at about 120–170° C. As mentioned above, the reagents are preferably allowed to react with one another in such quantity ratios that not more than 0.5 equivalent of NH group of the N-heterocyclic compound of Formula I is used per 1 epoxide equivalent of epoxide group, that is to say thus at least 1 mol of a diepoxide compound per 1 equivalent of NH group. The reaction can be accelerated by adding suitable catalysts. Such catalysts are for example alkali hydroxides such as sodium hydroxide or alkali halides such as lithium chloride, potassium chloride or sodium chloride, bromide or fluoride; tertiary amines such as triethylamine, tri-n-propylamine, benzyldimethylamine, N,N'-dimethylaniline and triethanolamine; quaternary ammonium bases such as benzyltrimethylammonium hydroxide; quaternary ammonium salts such as tetramethylammonium chloride, tetraethylammonium chloride, benzyltrimethylammonium chloride, benzyltrimethylammonium acetate or methyl-triethylammonium chloride; hydrazines having a tertiary nitrogen atom, such as 1,1-dimethylhydrazine, which can also be employed in the quaternized form.

Depending on the choice of the starting substances the reaction however in some cases takes place quantitatively so rapidly that no addition of catalyst is necessary. Whilst the starting substances are as a rule mixed with one another at room temperature and are then brought to the reaction temperature, it is advantageous in the case of very reactive components if the polyepoxide compound is first introduced and heated by itself to the requisite reaction temperature and the other reaction components then gradually added in small portions. The progress of the reaction up to the end product having a defined epoxide group content which essentially remains constant can be followed by titration of the epoxide groups using samples taken during the reaction.

The new so-called "advanced" addition products obtained according to the process of the invention are mostly solid at room temperature; their softening points as a rule lie between 40 and 140° C.; the color of these resin-like adducts varies from colorless glass-clear through yellow to brown. Because of their content of free epoxide groups these so-called "advanced" adducts react with the usual curing agents for epoxide compounds and can therefore be crosslinked or cured by adding such curing agents, analogously to other polyfunctional epoxide compounds or epoxide resins. Possible curing agents of this kind are basic or acid compounds.

As suitable curing agents there may for example be mentioned: amines or amides such as aliphatic, cycloaliphatic or aromatic primary, secondary and tertiary amines, for example monoethanolamine, ethylenediamine, hexamethylenediamine, trimethylhexamethylenediamine, diethylenetriamine, triethylenetetramine, tetraethylenepentamine, N,N-dimethylpropylenediamine-1,3, N,N-diethylpropylenediamine-1,3, bis(4'-amino-3-methyl-cyclohexyl)methane, 2,2-bis(4'-aminocyclohexyl)propane, 3,5,5-trimethyl - 3 - (aminomethyl)-cyclohexylamine ("isophoronediamine"), N-aminoethyl-piperazine, Mannich bases, such as 2,4,6-tris(dimethylaminomethyl)phenol; m-phenylenediamine, p-phenylenediamine, bis(p-aminophenyl)methane, bis(p-aminophenyl)sulphone and m-xylylenediamine; adducts of acrylonitrile or monoepoxides such as ethylene oxide or propylene oxide, to polyalkylenepolyamines such as diethylenetriamine or triethylenetetramine; adducts of polyamines such as excess diethylenetriamine or triethylenetetramine, and polyepoxides such as diomethane polyglycidyl ethers; ketimines, for example from acetone or methyl ethyl ketone and bis(p-aminophenyl)-methane; adducts of monophenols or polyphenols and polyamines; polyamides, especially those from aliphatic polyamines, such as diethylenetriamine or triethylenetetramine and dimerized or trimerized unsaturated fatty acids such as dimerized linseed oil fatty acid ("Versamid"); polymeric polysulphides ("Thiokol"); dicyandiamide; aniline-formaldehyde resins; polyhydric phenols, for example resorcinol, 2,2-bis(4-hydroxyphenyl)propane or phenol-formaldehyde resins; boron trifluoride and its complexes with organic compounds, such as BF$_3$-ether complexes and BF$_3$-amine complexes, for example BF$_3$-monoethylamine complex; acetoacetanilide-BF$_3$ complex; phosphoric acid, triphenylphosphite; polybasic carboxylic acids and their anhydrides, for example phthalic anhydride, tetrahydrophthalic anhydride, hexahydrophthalic anhydride, 4-methylhexahydrophthalic anhydride, 3,6-endomethylene - tetrahydrophthalic anhydride, methyl-3,6-endomethylenetetrahydrophthalic anhydride (=methylnadicanhydride), 3,4,5,6,7,7-hexachlor-3,6-endomethylene-tetrahydrophthalic anhydride, succinic anhydride, adipic anhydride, azelaic anhydride, sebacic anhydride, maleic anhydride, dodecenylsuccinic anhydride; pyromellitic dianhydride or mixtures of such anhydrides.

It is particularly advantageous to use curing agents which in themselves yield moulding materials of good electrical properties, such as especially cycloaliphatic dicarboxylic acid anhydrides such as for example Δ$^4$-tetrahydrophthalic anhydride or hexahydrophthalic anhydride, or cycloaliphatic polyamines such as for example 2,2-bis(4'-amino-cyclohexyl)propane or "isophoronediamine."

It is furthermore possible to use cure accelerators, during the cure, and in particular when using polyamides, polymeric polysulphides, dicyandiamide or polycarboxylic acid anhydrides as curing agents; such accelerators are for example tertiary amines, their salts or quaternary ammonium compounds, for example 2,4,6-tris(dimethylaminomethyl)phenol, benzyldimethylamines, 2-ethyl-4-methyl-imidazole or triamylammonium phenolate; or alkali metal alcoholates such as for example sodium hexanetriolate.

The expression "cure" as used here denotes the conversion of the above adducts containing epoxide groups into insoluble and infusible crosslinked products, and in particular as a rule with simultaneous shaping to give shaped articles such as castings, pressings or laminates, or to give two-dimensional structures such as coatings, lacquer films or adhesive bonds.

If desired, it is possible to add to the so-called "advanced" adducts containing epoxide groups according to the invention, active diluents such as for example styrene oxide, butylglycidyl ether, isooctylglycidyl ether, phenylglycidyl ether, cresylglycidyl ether or glycidyl esters of synthetic highly branched mainly tertiary aliphatic monocarboxylic acids ("Cardura E"), or cycloaliphatic monoepoxides such as 3-vinyl-2,4-dioxaspiro(5,5)-9,10-epoxyundecane.

The adducts according to the invention can furthermore be used mixed with other curable diepoxide or polyepoxide compounds. As such there may for example be mentioned: polyglycidyl ethers of polyhydric alcohols such as 1,4-butanediol, polyethylene glycols, polypropylene glycols or 2,2-bis-(4'hydroxycyclohexyl)-propane; polyglycidyl ethers of polyhydric phenols such as 2,2-bis-(4'-hydroxyphenyl)propane (=diomethane),
2,2-bis-(4'-hydroxy-3',5'-dibromophenyl)propane
bis-(4-hydroxyphenyl)sulphone,
1,1,2,2-tetrakis-(4-hydroxyphenyl)ethane or condensation products of formaldehyde with phenols produced in an acid medium, such as phenol novolacs or cresol novolacs; polyglycidyl esters of polycarboxylic acids such as for example phthalic acid diglycidyl ester, tetrahydrophthalic acid diglycidyl ester or hexahydrophthalic acid diglycidyl ester; triglycidyl isocyanurate, N,N'-diglycidyl-5,5 - dimethylhydantoin, or aminopolyepoxides such as are obtained by dehydrohalogenation of the reaction products of epihalogenohydrin and primary or secondary amines such as aniline or 4,4'-diaminodiphenylmethane; also alicyclic compounds containing several epoxide groups, such as vinylcyclohexene-diepoxide,
dicyclopentadienediepoxide,
ethylene glycol-bis-(3,4-epoxytetrahydrodicyclopentadien-8-yl)-ether,
(3,4-epoxycyclohexylmethyl)-3,4-epoxycyclohexanecarboxylate,
(3',4'-epoxy-6'-methylcyclohexylmethyl)-3,4-epoxy-6-methyl-cyclohexanecarboxylate,
bis(cyclopentyl)ether diepoxide or
3-(3',4'-epoxycyclohexyl)-2,4-dioxaspiro-(5,5)-9,10-epoxy-undecane.

The subject of the present invention therefore also includes curable mixtures which are suitable for the manumacture of shaped articles including two-dimensional structures and which contain the so-called "advanced" adducts containing epoxide groups according to the invention, optionally together with other diepoxide or polyepoxide compounds and also curing agents for epoxide resins such as polyamines or polycarboxylic acid anhydrides.

The adducts according to the invention, or their mixtures with other polyepoxide compounds and/or curing agents, can furthermore be mixed, at any stage before cure, with usual modifiers such as extenders, fillers and reinforcing agents, pigments, dyestuffs, organic solvents, plasticizers and the like.

As extenders, reinforcing agents, fillers and pigments which can be employed in the curable mixtures according to the invention there may for example be mentioned: coal tar, bitumen, glass fibres, boron fibres, carbon fibres, cellulose, polyethylene powder, polypropylene powder, mica, asbestos, quartz powder, slate powder, aluminum oxide trihydrate, chalk powder, gypsum, antimony trioxide, bentones, silica aerogel ("Aerosil"), lithopone, barite, titanium dioxide, carbon black, graphite, iron oxide or metal powder such as aluminum powder or iron powder.

The following are for example suitable as organic solvents for modifying the curable mixtures: toluene, xylene, n-propanol, butyl acetate, acetone, methyl ethyl ketone, diacetone-alcohol, ethylene glycol monomethyl ether, monoethyl ether and monobutyl ether.

Dibutyl, dioctyl and dinonyl phthalate, tricresyl phosphate, trixylenyl phosphate and also polypropylene glycols many for example be employed as plasticizers for modifying the curable mixtures.

Especially for use in the lacquer field, the new adducts containing epoxide groups can furthermore be partially or completely esterified in a known manner with carboxylic acids, such as especially higher unsaturated fatty acids. It is furthermore possible to add other curable synthetic resins, for example phenoplastics or aminoplastics, to such lacquer resin formulations.

It is furthermore also possible to add other usual additives, for example flameproofing agents, agents for conferring thixotropy, flow control agents such as silicones, cellulose acetobutyrate polyvinyl butyral, waxes, stearates and the like (which are in part also used as mould release agents) to the curable mixtures.

The curable mixtures can be manufactured in the usual manner with the aid of known mixing equipment (stirrers, kneaders, rollers and the like).

The curable epoxide resin mixtures are above all employed in the fields of surface protection, the electrical industry, laminating processes and the building industry. They can be used in a formulation which is in each case suited to the particular end use, in the unfilled or filled state, optionally in the form of solutions or emulsions, as paints, lacquers, sintering powders, compression moulding compositions, dipping resins, casting resins, injection moulding formulations, impregnating resins and adhesives, as tool resins, laminating resins, sealing and filling compositions, floor covering compositions and binders for mineral aggregates.

A main field of application lies in the field of compression moulding powders and of sintering powders. Here the epoxide resin powder mixtures can be processed without pressure or with pressure, according to known processes such as fluidized bed sintering, electrostatic fluidized bed sintering, spraying, electrostatic spraying, compression moulding and the like.

In the examples which follow, unless otherwise stated, parts denote parts by weight and percentages denote percentages by weight. The relationship of the parts by volume to the parts by weight is as that of the millilitre to the gram.

The following epoxide resins were used for the manufacture of so-called "advanced' adducts containing epoxide groups, described in the examples:

EPOXIDE RESIN A

Polyglycidyl ether resin (commercial product) manufactured by condensation of diomethane (2,2-bis(p-hydroxyphenyl)propane) with a stoichiometric excess of epichlorhydrin in the presence of alkali, consisting mainly of diomethane diglycidyl ether of formula

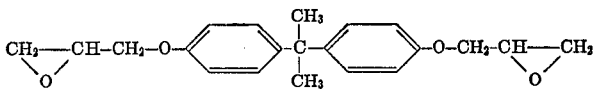

which is liquid at room temperature and has the following characteristics:

Epoxide content: 5.1–5.7 epoxide equivalents/kg.
Viscosity at 25° C.: 9000–13,000 cp.

EPOXIDE RESIN B

Poly-($\beta$-methylglycidyl)-ether resin manufactured by condensation of diomethane (2,2-bis(p-hydroxyphenyl)propane) with a stoichiometric excess of $\beta$-methylepichlorhydrin in the presence of alkali and consisting mainly of diomethane-diglycidyl ether of formula

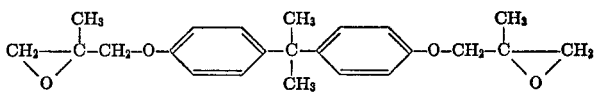

with an epoxide content of 4.45 epoxide equivalents/kg.

EPOXIDE RESIN C

Cycloaliphatic epoxide resin (commercial product) mainly consisting of the diepoxide of the formula (=(3',4'-epoxy-cyclohexyl-methyl)-3,4-epoxy - cyclohexane-carboxylate), which is liquid at room temperature and has the following characteristics:

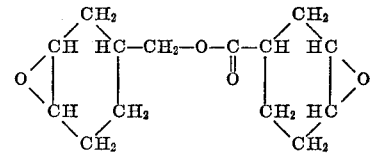

Epoxide content: 7.0–7.5 epoxide equivalents/kg.
Viscosity at 25° C.: about 350 cp.

EPOXIDE RESIN D

Cycloaliphatic epoxide resin (commercial product) mainly consisting of the diepoxide of the formula

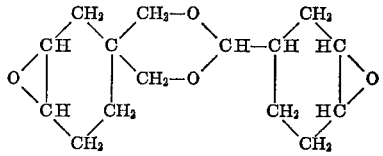

mainly consisting of the diepoxide of the formula (=3-(3',4'-epoxycyclohexyl) - 2,4 - dioxaspiro(5,5) - 8,9-epoxy-undecane), which is a viscous liquid at room temperature and has the following characteristics:

Epoxide content: 6.0–6.2 epoxide equivalents/kg.
Viscosity at 25° C.: 125,000–200,000 cp.

EPOXIDE RESIN E

Cycloaliphatic epoxide resin (commercial product) consisting mainly of the diepoxide of the formula

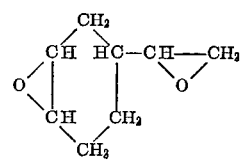

(=vinylcyclohexene-diepoxide), which is liquid and of low viscosity at room temperature and has the following characteristics:

Epoxide content: 13.8–14.0 epoxide equivalents/kg.
Viscosity at 25° C.: 25 cp.

EPOXIDE RESIN F

Cycloaliphatic polyglycidyl ester (commercial product) consisting mainly of hexahydrophthalic acid diglycidyl ester of formula

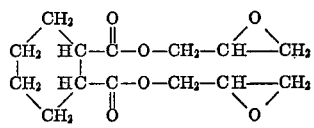

which is liquid at room temperature and has an epoxide content of 6.1–6.5 epoxide equivalents/kg.

EPOXIDE RESIN G

An N-heterocyclic epoxide resin (commercial product) consisting of crystalline triglycidyl isocyanurate of formula

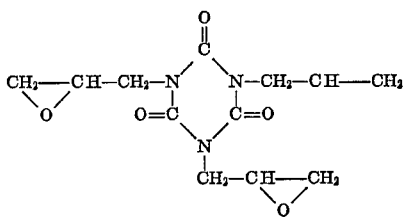

having an epoxide content of 9.1–9.8 epoxide equivalents/kg.

EPOXIDE RESIN H

An N-heterocyclic epoxide resin consisting of crystalline 1,3-diglycidyl-6-methyl-uracil of formula

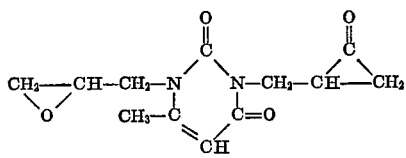

having an epoxide content of 8.3–8.4 epoxide equivalents/kg.

It can be manufactured as follows:

A mixture of 378.5 g. of 6-methyl-uracil (3.0 mols), 8325.0 g. of epichlorhydrin (90 mols) [corresponding to a 15 molar excess per 1 NH group] and 2.48 g. of tetraethylammonium chloride (0.5 mol percent) is heated to 90° C. with stirring and with a slight stream of nitrogen being introduced. The mixture is stirred at this temperature for 180 minutes. The entire 6-methyluracil dissolves progressively and after 130 minutes the solution is pale yellow and clear. The mixture is cooled to 60° C. and 434.0 g. of finely powdered solid sodium hydroxide (10.8 mols) are added in small portions with vigorous stirring over the course of 30 minutes, with the temperature being kept at 60° C. After the addition of the alkali the mixture is stirred for a further 20 minutes at 60° C. Then the mixture is distilled at 60° C. and about 40 mm. Hg with good stirring until all the water produced during the reaction has been azeotropically distilled off. The resulting salt is now separated from the solution by filtration and washed with a little epichlorhydrin. The combined epichlorhydrin solutions are then concentrated at 60° C. in a waterpump vacuum until no further epichlorhydrin distils off. The residue is thereafter further treated at 0.2 mm. Hg until the last traces of volatile constituents have been removed.

An ochre-colored crystal sludge is obtained in 92% yield (657.0 g.). The crude product contains 7.95 epoxide equivalents/kg. (=94.6% of theory) and 1.4% of chlorine. The product thus largely consists of 1,3-diglycidyl-6-methyl-uracil.

In order to purify it, the product can be recrystallized from methanol and after one recrystallization pale yellow to colorless crystals are obtained, having a melting point of 107–107.5° C. The epoxide content is 8.36 epoxide equivalents/kg. (99.7% of theory).

EPOXIDE RESIN I

A heterocyclic epoxide resin consisting of the crystalline diepoxide of formula

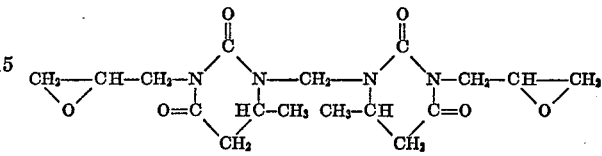

(3,3' - diglycidyl - 1,1' - methylene-bis(6-methyl-5,6-dihydro-uracil), having an epoxide content of 5.1–5.2 epoxide equivalents/kg.

It can be manufactured as follows:

(a) Manufacture of 1,1'-methylene-bis-(6-methyl-5,6-dihydro-uracil)

A homogeneous mixture of 20.0 g. of 6-methyl-5,6-dihydro-uracil (2,4-dihydroxy - 6-methyl-5,6-dihydro-pyrimidine) [0.156 mol], 2.5 g. of paraformaldehyde (0.078 mol) and 11.7 ml. of concentrated hydrochloric acid is thoroughly stirred at room temperature. The mixture spontaneously warms to about 45° C. over the course of 30 minutes, and is then warmed to 70° C. for a further 30 minutes whilst stirring. The mixture is allowed to stand overnight, 150 ml. of water are stirred into it, and the batch is filtered. The pure white finely crystalline substance is washed with cold water until the wash water reacts neutral. After drying at 120° C. 16.0 g. of 1,1'-methylene-bis-6-methyl-5,6-dihydro - uracil (72.1% of theory) of melting point 288–290° C. are obtained.

(b) Glycidylation

A mixture of 6.67 g. of 1,1'-methylene-bis-6-methyl-5,6-dihydro-uracil [0.025 mol], 92.5 g. of epichlorhydrin (1 mol, corresponding to 20 mols per mol of NH) and 0.041 g. of tetraethylammonium chloride (1 mol percent) is heated to 115–117° C. for 6 hours whilst stirring. After cooling to 60° C. 2.2 g. of finely powdered solid sodium hydroxide (0.055 mol) are added in small portions over the course of 30 minutes whilst stirring thoroughly. After working-up, 8.7 g. of a colorless resin of low viscosity are obtained (92.3% of theory), and this on cooling solidifies to give colorless small crystals; the epoxide content is 5.15 epoxide equivalents/kg. (corresponding to 98.0% of theory) and the melting point is 121–122° C. A sample was recrystallized from methanol. The 3,3'-diglycidyl-1,1'-methylene - bis(6 - methyl-5,6-dihydro-uracil) which had been recrystallized once melts at 128–129° C., its epoxide content is 5.19 epoxide equivalents per kg. (98.8% of theory) and the chlorine content is 0.5%.

EPOXIDE RESIN J

An N-heterocyclic epoxide resin consisting of the crystalline diepoxide of the formula

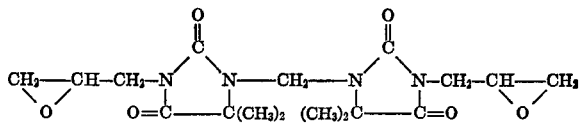

(3,3'-diglycidyl - 1,1' - methylene-bis(5,5-dimethylhydantoin)), having an epoxide content of 5.1 to 5.2 epoxide equivalents/kg.

It can be manufactured as follows:

A mixture of 268 g. (1 mol) of bis(5,5-dimethylhydantoinyl-1)methane, 2775 g. (30 mols) of epichlorhydrin and 1.5 g. of benzyltrimethylammonium chloride was heated to boiling at 110° C. The epichlorhydrin adds to both NH groups with the formation of, firstly, N-chlorhydrin groups and then N-glycidyl groups, with excess epichlorhydrin being converted to glycerine dichlorhydrin ("transepoxidation"). The formation of N-glycidyl groups during the reaction was followed on samples by titration after distilling off the unreacted epichlorhydrin and the dichlorhydrin formed during the transepoxidation. After ¾ hours the resin contained 2.3 epoxide equivalents per kg. and after 4½ hours 3.8 epoxide equivalents/kg.; the latter value corresponds to the transepoxidation equilibrium. The reaction mixture was cooled to 60° C. and subsequently 91 g. of 97% strength solid sodium hydroxide were added in portions over the course of 35 minutes. The temperature was kept at 60° C. by slight cooling. After addition of the sodium hydroxide the mixture was stirred for a further 30 minutes at 60° C. The reaction mixture was then concentrated under a vacuum of 35 mm. Hg until the entire quantity of the water of reaction had been azeotropically distilled off. Thereafter the sodium chloride formed was filtered off and washed with a little epichlorhydrin. The reaction product was then further concentrated, initially under a vacuum of 30 mm. Hg in order to recover the excess epichlorhydrin, and finally in a high vacuum.

363 g. of a slightly yellowish solid crystalline mass were obtained, and this was powdered and freed of the last traces of epichlorhydrin on a metal tray at 50° C. in a vacuum drying cabinet. 353 g. (92% of theory) of a slightly yellowish crystalline resin remained. This product contained 5.15 epoxide equivalents/kg. and 0.7% of chlorine and consisted of 3,3'-diglycidyl-1,1'-methylene-bis-(5,5-dimethylhydantoin).

EPOXIDE RESIN K

An N-heterocyclic epoxide resin consisting of the crystalline diepoxide of the formula

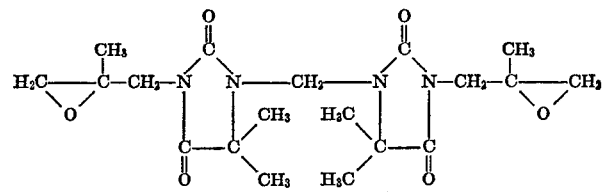

[1,1'-methylene-bis(3 - β - methylglycidyl-5,5-dimethylhydantoin)], having an epoxide content of 4.78 epoxide equivalents/kg.

It can be manufactured as follows: 268 g. of 1,1'-methylene-bis(5,5-dimethylhydantoin) [1.0 mol], 3195 g. of β-methylepichlorhydrin (30 mols) and 1 g. of tetramethylammonium chloride were heated to boiling. After 3½ hours the solution was cooled to 60° C. and 98.9 g. of 97% strength sodium hydroxide (2.4 mols) were added in portions over the course of 20 minutes. After a further 30 minutes the water of reaction was distilled off azeotropically. The reaction mixture was then treated with 50 g. of fuller's earth and 50 g. of active charcoal, cooled to 20° C. and filtered. The clear filtrate was concentrated on a rotational evaporator and finally freed of the last volatile constituents in a high vacuum.

407 g. (99.5% of theory) of a yellowish crystalline substances were obtained, which contained 4.78 epoxide equivalents/kg. (theory 4.89).

After recrystallization the pure compound of melting point 118.2°–120.3° C. was obtained.

EXAMPLES OF MANUFACTURE

Example 1

752 parts of epoxide resin A (liquid diomethane-diglycidyl ether having an epoxide content of 5.3 epoxide equivalents per kg.) were heated to 160° C., 0.2 part by volume of 30% strength aqueous sodium hydroxide solution were added and 268 parts of 1,1'-methylene-bis-(5,5-dimethylhydrantoin) were introduced over the course of 15 minutes while stirring. After 1 hour and 30 minutes the epoxide content of the reaction mixture is 2.1 epoxide equivalents/kg. After 1 hour and 45 minutes the reaction is ended by pouring the melt out onto a metal sheet.

A brittle yellowish so-called "advanced" epoxide resin is obtained, having an epoxide content of 1.97 epoxide equivalents/kg. and a softening point of 69° C.

Example 2

752 parts of epoxide resin A (liquid diomethane-diglycidyl ether having an epoxide content of 5.3 epoxide equivalents per kg.), 326 parts of β,β'-bis-(5,5-dimethylhydantoinyl-3)diethyl ether and 0.2 parts by volume of 30% strength aqueous sodium hydroxide solution are heated to 115° C., whereupon an exothermic reaction occurs; the reaction temperature is limited to 146° C. by cooling with ice water. After 40 minutes the epoxide content of the reaction mixture is 1.66 epoxide equivalents/kg. After 45 minutes the reaction is ended by pouring the melt out onto a metal sheet.

A brittle yellowish so-called "advanced" epoxide resin is produced, having an epoxide content of 1.5 epoxide equivalents/kg. and a softening point of 62° C.

Example 3

188 parts of epoxide resin A (liquid diomethane-diglycidyl ether having an epoxide content of 5.3 epoxide equivalents/kg.), 77.5 parts of 3,3'-tetramethylene-bis-(5,5-dimethylhydantoin) and 0.1 parts by volume of 30% strength aqueous sodium hydroxide solution are heated to 160° C. while stirring. After 45 minutes a further 0.1 parts by volume of 30% strength aqueous sodium hydroxide solution are added. After 3 hours and 15 minutes the epoxide content of the reaction mixture is 2.38 epoxide equivalents per kg. After 6 hours and 45 minutes the reaction is ended by pouring the melt out onto a metal sheet.

A brittle so-called "advanced" epoxide resin is obtained, having an epoxide content of 1.96 epoxide equivalents/kg. and a softening point of 57° C.

Example 4

833 parts of epoxide resin C (liquid cycloaliphatic epoxide resin with an epoxide content of 7.2 epoxide equivalents/kg.) and 0.2 part by volume 30% strength aqueous sodium hydroxide solution are heated to 160° C. while stirring and 402 parts of 1,1'-methylene-bis-(5,5-dimethylhydantoin) [corresponding to a ratio of epoxide group: NH group=2:1] are introduced with stirring over the course of 42 minutes. After 1 hour and 20 minutes a further 0.2 parts by volume of 30% strength aqueous sodium hydroxide solution are added. After 2 hours and 30 minutes the epoxide content of the reaction mixture is 2.95 epoxide equivalents/kg., with the temperature now being raised to 180° C. After 3 hours the reaction is ended by pouring the melt out onto a metal sheet. A light brown brittle so-called "advanced" resin is obtained, having an epoxide content of 2.4 epoxide equivalents/kg. and a softening point of 99° C.

Example 5

1055.1 parts of epoxide resin D (liquid cycloaliphatic epoxide resin with an epoxide content of 6.0 epoxide equivalents per kg.) together with 515 parts of β,β'-bis-(5,5-dimethylhydantoinyl-3)-diethyl ether (corresponding to a ratio of epoxide groups to NH groups=2:1) and 0.63 parts by volume of 30% strength aqueous sodium hydroxide solution are heated to 160° C. for 2 hours while stirring. After 40 minutes the epoxide content of the reaction mixture is 2.85 epoxide equivalents/kg.; after 60 minutes it is 2.61 epoxide equivalents/kg. and after 1 hour and 4.5 minutes it is 2.1 epoxide equivalents/kg.

A brown brittle so-called "advanced" epoxide resin is obtained, having an epoxide content of 2.04 epoxide equivalents per kg. and a softening point of about 116° C.

Example 6

290 parts of epoxide resin E (liquid vinylcyclohexenediepoxide with an epoxide content of 13.8 epoxide equivalents per kg.) 338 parts of 3,3-hexamethylene-bis-(5,5-dimethylhydantoin) [corresponding to a ratio of epoxide groups: NH groups=2:1] and 0.1 parts by volume of equeous 30% strength sodium hydroxide solution are heated to 160° C. while stirring; after 45 minutes reaction time the epoxide content of the reaction mixture is 4.4 epoxide equivalents/kg. After 1 hour and 50 minutes the reaction is ended by pouring the melt out onto a metal sheet. A sticky so-called "advanced" epoxide resin is obtained, having an epoxide content of 2.84 epoxide equivalents/kg.

Example 7

72.5 parts of epoxide resin E (liquid vinylcyclohexenediepoxide having an epoxide content of 13.8 epoxide equivalents per kg.) and 67 parts of 1,1'-methylene-bis-(5,5-dimethylhydantoin) [corresponding to a ratio of epoxide groups: NH groups=2:1] are heated to 160° while stirring and after 50 minutes 0.05 part by volume of 30% strength aqueous sodium hydroxide solution are added. After 1 hour and 40 minutes the epoxide content of the reaction mixture is 3.45 epoxide equivalents per kg. After 1 hour and 55 minutes the reaction is ended by pouring the melt out onto a metal sheet. A yellowish brown brittle so-called "advanced" epoxide resin is obtained, having an epoxide content of 3.3 epoxide equivalents per kg. and a softening point of 88° C.

Example 8

A mixture of 151.6 parts of epoxide resin A (liquid diomethane-diglycidyl ether having an epoxide content of 5.28 epoxide equivalents/kg.), 53.8 parts of 1,1'-methylene-bis-(6-methyl-5,6-dihydrouracil) [corresponding to a ratio of epoxide groups: NH groups=2:1] and 0.2 part by volume of 30% strength aqueous sodium hydroxide solution is heated to 150° C. with good stirring and kept at this temperature for 21 hours. After 6 hours the epoxide content of the reaction mixture is 2.94 epoxide equivalents/kg. After completion of the reaction a brown brittle so-called "advanced" epoxide resin is obtained, having an epoxide content of 2.0 epoxide equivalents/kg. (theory 1.9), a softening point of about 55° C. and a flow point of about 80° C. It is suitable for use in compression molding powders and fluidized bed sintering powders, and also for use as a casting resin.

Example 9

A mixture of 51.2 parts of epoxide resin C (liquid cycloaliphatic epoxide resin with an epoxide content of 7.2 epoxide equivalents/kg.), 0.33 parts of tetraethylammonium chloride and 26.8 parts of 1,1'-methylene-bis-(6-methyl-5,6-dihydrouracil) [corresponding to a ratio of epoxide groups to NH groups=2:1] is stirred at 165° C. After 19 hours the epoxide content of the reaction mixture is 3.68 epoxide equivalents/kg. and after 29 hours the reaction is ended. A brown so-called "advanced" epoxide resin is obtained, having an epoxide content of 2.58 epoxide equivalents/kg. (theory 2.7) and a softening point of about 60° C.; the product begins to flow at about 80° C.

Example 10

47.7 parts of epoxide resins H (1,3-diglycidyl-6-methyluracil having an epoxide content of 8.35 epoxide equivalents/kg.) are fused at 125° C. and mixed with 0.1 part by volume of 30% strength aqueous sodium hydroxide solution. 26.8 parts of 1,1'-methylene-bis-(6-methyl-5,6-dihydrouracil) [corresponding to a ratio of epoxide groups:NH groups=2:1] are then added over the course of 20 minutes in small portions with good stirring. After the last addition of the bis(dihydrouracil) derivative the reaction is ended. A so-called "advanced" epoxide resin is obtained, having an epoxide content of 2.66 epoxide equivalents/kg. (theory: 2.69); the product softens at 110° C. and begins to flow at 140–150° C.

Example 11

A mixture of 76.1 parts of epoxide resin I [3,3'-diglycidyl-1,1'-methylene - bis(6-methyl-5,6-dihydrouracil) having an epoxide content of 5.15 epoxide equivalents/kg.], 26.8 parts of 1,1'-methylene-bis(6-methyl-5,6-dihydrouracil) [corresponding to a molar ratio of 2:1] and 0.3 parts by volume of 30% strength aqueous sodium hydroxide solution is stirred for 60 minutes at 130° C. A light ochre-colored so-called "advanced" epoxide resin is obtained, having an epoxide content of 1.52 epoxide equivalents/kg. and a softening point of 110° C.; the product begins to flow at about 140° C.

Example 12

59.2 parts of epoxide resin J [3,3'-diglycidyl-1,1'-methylene-bis(5,5-dimethylhydantoin) having an epoxide content of 5.15 epoxide equivalents/kg.] are fused at 160° C. to 170° C. 20.3 parts of 1,1'-methylene-bis(6-methyl-5,6-dihydrouracil) are stirred into this melt over the course of 15 minutes. After 65 minutes the mixture is cooled and an ochre-colored so-called "advanced" epoxide resin is obtained having an epoxide content of 2.0 epoxide equivalents/kg. (theory: 1.9); the product softens at 95–100° C. and begins to flow at about 120° C.

Example 13

70.4 parts of epoxide resin A (diomethane-diglycidyl ether having an epoxide content of 5.70 equivalents/kg.) are stirred at 145° C. 0.33 part of tetraethylammonium chloride are added and 29.6 parts of 1,1'-methylene-bis-(5,5-dimethyl-5,6-dihydrouracil) are stirred in over the course of 30 minutes. The epoxide content of a sample is then 2.36 equivalents/kg. After a further 40 minutes at 145° C. the reaction product is poured into a porcelain dish to cool and is comminuted. A practically colorless resin having 2.08 epoxide equivalents/kg. and a softening point of 68° C. is obtained in quantitative yield.

Example 14

51.2 parts of epoxide resin C (a cycloaliphatic epoxide resin consisting mainly of (3',4'-epoxy-cyclohexylmethyl)-3,4-epoxy-cyclohexanecarboxylate, having an epoxide content of 7.5 equivalents/kg.) are heated to 140° C. and stirred. After adding 0.99 parts of tetraethylammonium chloride, 29.63 parts of 1,1'-methylene-bis(5,5-dimethyl-5,6-dihydrouracil) are stirred in over the course of 1 hour; thereafter the epoxide content of the mixture is 5.08 equivalents/kg. Afer a further 5½ hours 3.02 epoxide equivalents are still found. After a total of 14 hours the so-called "advanced" resin is poured out onto a porcelain dish. A light ochre-colored resin having 2.63 epoxide equivalents/kg. and softening at 72° C. is obtained in quantitative yield.

Example 15

62.5 parts of epoxide resin G (triglycidyl isocyanurate having an epoxide content of 9.5 equivalents/kg.) are fused at 130° C. To this melt are added, with stirring, 0.3 millilitres of 50% strength sodium hydroxide solution and, over the course of 15 minutes, 29.6 parts of 1,1'-methylene-bis(5,5-dimethyl-5,6-dihydrouracil). The mixture then has an epoxide content of 5.76 equivalents/kg. After 1 hour the reaction mixture is poured into a porcelain dish to cool. The almost colorless so-called "advanced" resin, which softens at 72° C. and has an epoxide content of 4.64 equivalents/kg., is obtained in quantitative yield.

Example 16

50 parts of epoxide resin B [diomethane-bis(β-methylglycidyl ether) having an epoxide content of 4.45 epoxide equivalents/kg.] are heated to 120° C. and 14.9 parts of 1,1'-methylene-bis(5,5-dimethylhydantoin) are rapidly introduced. The temperature is raised to 165° C. over the course of 2 hours, 0.02 part by volume of 40% strength benzyltrimethylammonium hydroxide solution in methanol are added and the mixture is allowed to react for a further 4 hours at 165° C. Thereafter 0.02 part by volume of 30% strength aqueous sodium hydroxide solution are added, whereupon a weak exothermic reaction occurs. After a further 15 minutes' reaction time the melt is poured onto a metal sheet to cool, and a solid so-called "advanced" epoxide resin is obtained, having an epoxide content of 1.58 epoxide equivalents/kg. and a softening point of 70° C.

Example 17

659 parts of epoxide resin G (crystalline triglycidyl isocyanurate having an epoxide content of 9.1 epoxide equivalents/kg.) together with 0.4 parts by volume of 30% strength aqueous sodium hydroxide solution are heated to 160° C. 338 parts of 1,6-bis(5,5-dimethylhydantoinyl-3')-hexane (corresponding to a ratio of epoxide group:NH group=3:1) are added in portions while stirring. The addition takes place over the course of 35 minutes. After a total of 35 minutes the melt is poured into a dish to cool. A yellowish brittle so-called "advanced" epoxide resin is obtained which has an epoxide content of 3.84 epoxide equivalents/kg. and a softening point of 69° C.

Example 18

649 parts of epoxide resin F (hexahydrophthalic acid diglycidyl ester having an epoxide content of 6.16 epoxide equavalents per kg.) were heated to 160° C.–170° C. and 268 parts of 1,1'-methylene-bis(5,5-dimethylhydantoin) (corresponding to a ratio of epoxide group:NH group=2:1) were added over the course of 1 hour whilst stirring. After a total of 90 minutes' reaction time the reaction is ended by pouring the mixture out into a dish. A yellowish brittle so-called "advanced" epoxide resin is obtained, having an epoxide content of 1.97 epoxide equivalents per kg. and a softening point of 56° C.

Example 19

80 parts of epoxide resin K (1,1'-methylene-bis[3-$\beta$-methylglycidyl-5,5-dimethylhydantoin] having an epoxide content of 4.79 epoxide equivalents/kg.) are heated to 145° C. and 25.6 parts of 1,1'-methylene-bis(5,5-dimethylhydantoin) (corresponding to a ratio of epoxide groups:NH groups=2:1) are introduced over the course of 20 minutes whilst stirring, and with the temperature being raised up to 160° C. After 1 hour 30 minutes the epoxide content has fallen to 2.67 epoxide equivalents/kg. After 3 hours 35 minutes the reaction is ended by pouring the melt out onto a metal sheet. The resulting solid so-called "advanced" epoxide resin has an epoxide content of 2.06 epoxide equivalents/kg. and a softening point of 104° C.

USE EXAMPLES

Example I 80 parts of the so-called "advanced" epoxide resin manufactured in Example 8, having an epoxide content of 2.0 epoxide equivalents/kg., are fused with 20.8 parts of hexahydrophthalic anhydride at about 100° C. The mixture is cast into pre-warmed aluminium moulds and is cured for 5 hours at 120° C. and then for 15 hours at 150° C.

The resulting castings have a heat distortion point according to Martens(DIN 53,458) of 111° C.

Example II

A mixture of 80 parts of the so-called "advanced" epoxide resin manufactured according to Example 1, having an epoxide content of 1.97 epoxide equivalents/kg. and a softening point of 69° C., and of 21.6 parts of tetrahydrophthalic anhydride is stirred at 120° C. to give a clear melt and is then cast into an aluminium mould prewarmed to 120° C. Cure takes place for 4 hours at 120° C. and 16 hours at 150° C. A clear pale yellow casting is obtained, having the following mechanical properties:

Flexural strength (VSM) _____ kg./mm.² __ 13.84
Deflection at break _____ mm __ 6.4
Impact strength (VSM) _____ cm. kg./cm.² __ 8.14

Example III

A mixture of 66 parts of the so-called "advanced" epoxide resin manufactured according to Example 2, having an epoxide content of 1.5 epoxide equivalents/kg. and a softening point of 62° C., and of 22.6 parts tetrahydrophthalic anhydride is processed at 110° C. to give a clear homogeneous mixture and is cast into an aluminium mould prewarmed to 120° C. Cure takes place as described in Example II. The light brown moulding thus obtained has a flexural strength (VSM) of 3.0 kg./mm.².

Example IV 64.3 parts of the so-called "advanced" epoxide resin manufactured according to Example 3, having an epoxide content of 1.96 epoxide equivalents per kg. and a softening point of 57° C., are stirred with 39 parts of tetrahydrophthalic anhydride at 120° C. to give a homogeneous melt and subsequently cast into an aluminium mould prewarmed to 120° C. Cure takes place as described in Example II. The colorless moulding thus obtained has a flexural strength (VSM) of 3.8 kg./mm.².

Example V 30 parts at a time of the so-called "advanced" epoxide resin manufactured in Example 2, having an epoxide content of 1.5 epoxide equivalents/kg. and a softening point of 62° C., were finely powdered, mixed with the amounts of curing agent specified in the table below, and then processed as follows:

(a) The bulk of the resin-curing agent mixture was in each case fused at 80° C., and gelled, in a tin can which had beforehand been treated with release agent, and then was cured for 2 hours at 80° C. and 8 hours at 140° C. After cooling the plastic plaque was taken out of the tin can and the Shore C hardness was measured according to DIN 53,505. The values thus recorded were included in the table.

(b) A small part of the resin-curing agent mixture was applied to one end of a strip of an aluminium alloy sheet (registered tradename "Anticorodal B") of size 170 x 25 x 1 mm. and a second similar sheet metal strip was laid on top in such a way that the two sheet metal strips overlap 1 cm. and that the as yet uncured resin-curing agent mixture is present in the overlapping part between the two sheet metal strips. The sheet metal strips were fixed in this position by a hose clamp and introduced into a heating cabinet, in which the resin-curing agent mixture was first gelled for 2 hours at 80° C. and initially cured, and then fully cured for 8 hours at 140° C. Three such test specimens were produced with each amine curing agent and the tensile shear strength of the adhesive bonds was then determined in a tensile test. The mean values from three experiments are given in the table which follows:

|  | Test 1 | Test 2 | Test 3 |
|---|---|---|---|
| So-called "advanced" epoxide resin according to Example 2, parts | 30 | 30 | 30 |
| Bis(p-aminophenyl)-methane, parts | 2.2 | | |
| Bis(3-methyl-4-amino-cyclohexyl)-methane | | 2.7 | |
| Polyamide curing agent (registered tradename of Messrs. Schering "Genamid GMI 350") | | | 5.75 |
| Cure conditions | \multicolumn{3}{c}{2 hours at 80° C. plus 8 hours at 140° C.} | | |
| Shore C Hardness | 92 | 85 | 89 |
| Tensile shear strength on "Anticorodal B" (kg./mm.²) | 3.02 | 2.37 | 2.91 |

Example VI

A powder mixture of the finely ground so-called "advanced" epoxide resin according to Example 2 having an epoxide content of 1.5 epoxide equivalents/kg. and bis(p-aminophenyl)-methane in a mixing ratio of 100:7.4 parts was used for the manufacture of a laminant sheet.

For this purpose, 12 square cuttings of 12 cm. edge length of woven glass fabric 92145 of. Interglas were prepared. The first cutting was laid on a sheet of cellophane which had first been pre-treated with release agent, then powdered with the pulverulent resin-curing agent mixture, the next piece of woven glass fabric was laid on top and again powdered, and so on. After laying the 12th piece of woven glass fabric on top, the entire packet was wrapped in the cellophane sheet and introduced between two metal sheets into a press pre-warmed to 160° C. Gelling was started under contact pressure and the system was then cured under pressure for 1 hour. After a post-cure of 10 hours at 120° C. effected outside the press the mechanical properties of the resulting laminate, having a thickness of 3 mm. and a glass content of 67.9%, were determined.

The following values were measured:

Flexural strength (VSM) _____kg./mm.² __ 54.3
Deflection before break (VSM) _____mm__ 4.6
Impact strength (VSM) _____cm. kg./cm.² __ 122.7

We claim:
1. An advanced addition product containing vic-epoxide groups, which is obtained by heating a mixture of
   (1) an N-heterocyclic polyepoxide having an average of at least 2 and at most 3 vic-epoxide groups in the molecule, and
   (2) less than 1 equivalent of NH groups per 1 epoxide group equivalent of the polyepoxide (1) of a binuclear N-heterocyclic compounds of the formula

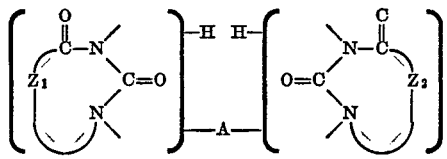

wherein $Z_1$ and $Z_2$ is a radical of the formula

where $R_1$ and $R_2$ is selected from the group consisting of hydrogen or alkyl of 1 to 4 carbon atoms; or together $R_1$ and $R_2$ form tetramethylene or pentamethylene, and A is a member selected from the group consisting of alkylene and alkylene interrupted by at least one oxygen atom.

2. An adduct as claimed in claim 1, wherein the polyepoxide (1) is triglycidyl isocyanurate.

3. An adduct as claimed in claim 1 characterized in that the polyepoxide (1) is tri-(β-methyl-glycidyl)-isocyanurate.

4. An adduct as claimed in claim 1, wherein the polyepoxide (1) is 1,3-diglycidyl-5,5-dimethyl-hydantoin or 1,3-diglycidyl-5-isopropyl-hydantoin.

5. An adduct as claimed in claim 1 wherein the polyepoxide (1) is 1,3-diglycidyl-imidazolidone-2 or 1,3-diglycidyl - 5,5-dimethyl-5,6-dihydro-uracil or 1,3-diglycidyl-5,5-dimethyl-6-isopropyl-5,6-dihydro-uracil.

6. The adduct of claim 1 wherein the polyepoxide (1) is 1,1'-methylene-bis (3-β-methylglycidyl-5,5 dimethylhydantoin and component (2) is 1,1' - methylene-bis (5,5-dimethyl-hydantoin).

References Cited

UNITED STATES PATENTS

| | | | |
|---|---|---|---|
| 3,542,803 | 11/1970 | Porret et al. | 260—18 X |
| 3,518,220 | 6/1970 | Landua et al. | 260—47 EN |
| 3,391,097 | 7/1968 | Williamson | 260—2 X |

WILLIAM H. SHORT, Primary Examiner

T. E. PERTILLA, Assistant Examiner

U.S. Cl. X.R.

117—124 E, 132 BE, 169 R; 161—185; 260—2 N, 9, 2 BP, 18 Ep, 28, 30.4 Ep, 37 Ep, 47 Ep, 49, 59, 77.5 NC, 78.4 Ep, 248 R, 260, 309.5, 309.7, 830 R, 830 TW, 831, 834